(12) United States Patent
Tsukagoshi

(10) Patent No.: US 9,632,401 B2
(45) Date of Patent: Apr. 25, 2017

(54) PROJECTOR

(71) Applicant: Seiko Epson Corporation, Tokyo (JP)

(72) Inventor: Shinichi Tsukagoshi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 20 days.

(21) Appl. No.: 14/717,170

(22) Filed: May 20, 2015

(65) Prior Publication Data

US 2015/0338724 A1 Nov. 26, 2015

(30) Foreign Application Priority Data

May 23, 2014 (JP) .................................. 2014-106811

(51) Int. Cl.
*G03B 21/14* (2006.01)
*G03B 5/02* (2006.01)
*H04N 9/31* (2006.01)
*G03B 21/00* (2006.01)

(52) U.S. Cl.
CPC ............. *G03B 21/147* (2013.01); *G03B 5/02* (2013.01); *G03B 21/142* (2013.01); *H04N 9/3185* (2013.01); *G03B 21/005* (2013.01)

(58) Field of Classification Search
CPC ........... G03B 21/14; G03B 21/00; H04N 5/74
See application file for complete search history.

(56) References Cited

U.S. PATENT DOCUMENTS 7,322,701 B2    1/2008 Kamimura et al.

2006/0050244 A1    3/2006 Kamimura et al.
2012/0162608 A1*   6/2012 Eguchi ............... G02B 27/2264
                                                353/7
2013/0057657 A1*   3/2013 Kanayama ......... H04N 5/23258
                                                348/47

FOREIGN PATENT DOCUMENTS

| JP | 2006-74593 A | 3/2006 |
|---|---|---|
| JP | 2007-17537 A | 1/2007 |
| JP | 2007-19654 A | 1/2007 |
| JP | 2007-19655 | 1/2007 |
| JP | 2008-236503 A | 10/2008 |
| JP | 4985950 B | 7/2012 |
| JP | 2012-182611 A | 9/2012 |

* cited by examiner

*Primary Examiner* — Sultan Chowdhury
*Assistant Examiner* — Danell L Owens
(74) *Attorney, Agent, or Firm* — ALG Intellectual Property, LLC

(57) ABSTRACT

A projector includes a lens shift mechanism that is capable of lens shift of shifting the lens in an upward/downward direction or a leftward/rightward direction, a distortion correction information input section that allows input of distortion correction information used to correct distortion of projected image light projected on a projection surface, a shift correction information input section that allows input of shift correction information relating to the lens shift, and an image generation section that generates the image based on the distortion correction information. The shift correction information input section has an input menu image. The input menu image contains choices for inputting the shift correction information. The choices include a maximum amount of lens shift of the lens in at least one of the upward/downward direction and the leftward/rightward direction. The image generation section generates the image based on the distortion correction information and the shift correction information.

4 Claims, 7 Drawing Sheets

PROJECTOR

The entire disclosure of Japanese Patent Application No. 2014-106811, filed May 23, 2014 is expressly incorporated by reference herein.

BACKGROUND

1. Technical Field

The present invention relates to a projector that allows correction of a lens shift.

2. Related Art

It has been known that a projector has functions of lens shifting and trapezoidal distortion correction (hereinafter referred to as distortion correction) for adjusting the position and shape of a projected image projected on a screen or any other projection surface. For example, when the screen is not installed in front of the projector, a lens is shifted in lens shift operation to move the position of the projected image horizontally or vertically. When part of the projected image is still outside the screen, a projector body is so inclined that the entire projected image falls within the screen. In the state in which the projector body is inclined and the projected image falls within the screen, since the shape of the projected image is trapezoidally distorted, distortion correction is so applied that the projected image has a rectangular shape.

In the distortion correction performed by lens shifting operation, it has been known that the effect of the correction changes with the position of the shifted lens. JP-A-2008-236503 describes a projector that incorporates a motorized lens shift mechanism that performs lens shift operation to correct distortion of a projected image appropriately on a detected lens position basis.

The motorized lens shift mechanism incorporated in the projector described in JP-A-2008-236503, however, has a complicated configuration including an electric circuit, resulting in increases in parts cost and manufacturing cost and further resulting in an increase in the weight of the product. It has therefore been difficult to incorporate such a motorized lens shift mechanism in a home-use projector in a medium-to-low price range used in typical households. On the other hand, in a typical household application or other similar types of application, the installation position of a projector and the projection position are both restricted, and the projection position cannot be in front of the installation position in many cases, resulting a high demand for a lens shift mechanism. In these circumstances, a home-use projector employs a manually operated lens shift mechanism that can be incorporated at a low price. The manual lens shift mechanism, which cannot detect the position of a shifted lens, however, cannot appropriately correct distortion on a lens position basis.

SUMMARY

An advantage of some aspects of the invention is to provide a projector including a manual lens shift mechanism capable of appropriately correcting distortion.

Application Example 1

This application example is directed to a projector including a light source, a light modulator that modulates light emitted from the light source in accordance with image information to form image light, a projection section that projects the modulated image light from the light modulator through a lens, a lens shift section that is capable of lens shift of shifting the lens in at least one of an upward/downward direction and a leftward/rightward direction, a distortion correction information input section that allows input of distortion correction information used to correct distortion of the projected image light projected by the projection section on a projection surface, a shift correction information input section that allows input of shift correction information relating to the lens shift, and an image generation section that generates the image information based on the distortion correction information and the shift correction information. The shift correction information input section has an input menu image to be projected by the projection section. The input menu image contains a plurality of choices to choose from to input the shift correction information, and the plurality of choices include a choice representing a maximum amount of lens shift of the lens in at least one of the upward/downward direction and the leftward/rightward direction.

According to this application example, the shift correction information input section has the input menu image containing choices that allow input of maximum amounts of lens shift in the upward/downward direction and the leftward/rightward direction. Even when the lens shift section has a manual mechanism, the shift correction information input section allows acquisition of the amount of lens shift and detection of the lens position, whereby distortion can be appropriately corrected on a lens position basis.

Application Example 2

This application example is directed to the projector according to the application example described above, wherein the choices to choose from as the shift correction information are formed only of a choice representing the maximum amount of lens shift of the lens in at least one of the upward/downward direction and the leftward/rightward direction.

According to this application example, in a usage scene in which the projection position is determined by using a lens shift mechanism to shift the lens position by the maximum amount of shift and inclining a projector body, a user can readily choose the amount of lens shift to perform accurate distortion correction.

Application Example 3

This application example is directed to the projector according to the application example described above, wherein the choices to choose from as the shift correction information includes a choice representing a middle amount of lens shift of the lens in at least one of the upward/downward direction and the leftward/rightward direction.

According to this application example, in a usage scene in which the projection position is determined without operation of the lens shift mechanism but with the projector body inclined, the user can choose the middle amount of shift to perform accurate distortion correction.

Application Example 4

This application example is directed to the projector according to the application example described above, wherein the choices to choose from as the shift correction information are formed only of a choice representing the amount of lens shift of the lens in the upward/downward direction.

According to this application example, to change the projection position in the upward/downward direction, the position of the lens shifted by the lens shift mechanism by an arbitrary amount can be chosen as the amount of shift.

Application Example 5

This application example is directed to the projector according to the application example described above, wherein the choices to choose from as the shift correction information are formed only of a choice representing the amount of lens shift of the lens in the leftward/rightward direction.

According to this application example, to change the projection position in the leftward/rightward direction, the position of the lens shifted by the lens shift mechanism by an arbitrary amount can be chosen as the amount of shift.

Application Example 6

This application example is directed to a projector including a light source, a light modulator that modulates light emitted from the light source in accordance with image information to form image light, a projection section that projects the modulated image light from the light modulator through a lens, a lens shift section that is capable of lens shift of shifting the lens in at least one of an upward/downward direction and a leftward/rightward direction, a distortion correction information input section that allows input of distortion correction information used to correct distortion of the projected image light projected by the projection section on a projection surface, and an image generation section that generates the image information based on the distortion correction information, and the distortion correction information is set in consideration of a maximum amount of shift of the lens in the upward direction.

According to this application example, in a usage scene in which the projection position is determined by using a lens shift mechanism to shift the lens position by the maximum amount of shift and inclining a projector body, the user only needs to input a value through the distortion correction information input section for accurate distortion correction in consideration of lens position information.

Application Example 7

This application example is directed to the projector according to the application example described above, wherein the projector further includes a distortion correction mode choosing section that allows a mode of the distortion correction information to be chosen, and the mode of the distortion correction information includes a first mode in which the maximum amount of shift of the lens in the upward direction is considered and a second mode in which the amount of lens shift is not considered.

According to this application example, in a case where the lens in the projector is shifted upward by the maximum amount, the first mode is chosen, whereas in a case where the lens is not shifted, the second mode is chosen, whereby appropriate distortion correction information can be applied in each of the cases.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described below. The embodiment that will be described below is not intended to unduly limit the contents of the invention set forth in the claims. Further, all configurations that will be described in the embodiment are not necessarily essential configuration requirements.

First Embodiment

Figure 1:
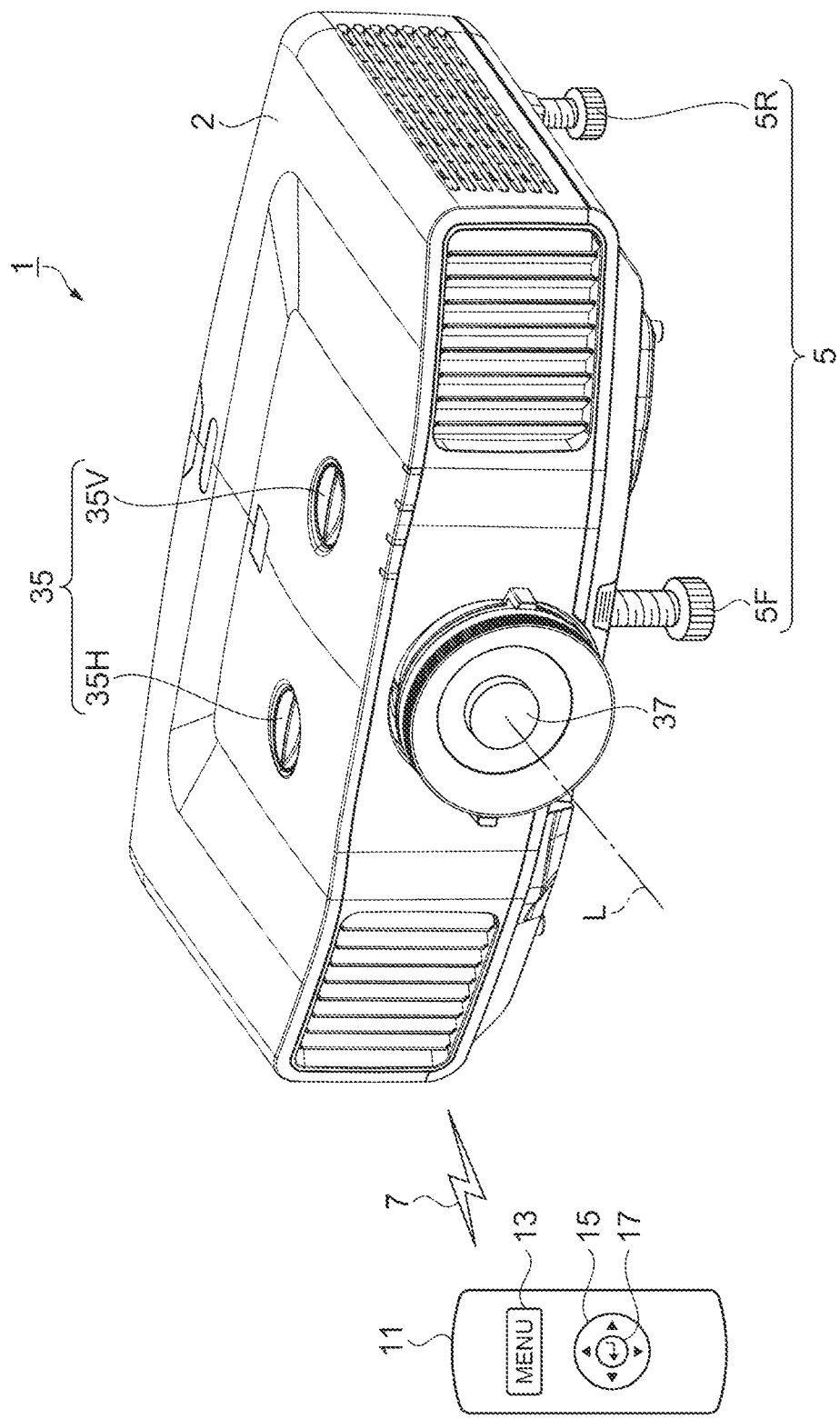
FIG. 1 is a descriptive diagram showing a summary of a projector according to a first embodiment.

FIG. 1 is a descriptive diagram showing a summary of a projector according to a first embodiment. The summary of a projector 1 according to the present embodiment will first be described.

Summary of Projector 1

The projector 1 shown in FIG. 1 is formed, for example, of a projector body 2 and a remote control 11. The projector body 2 includes feet 5, a projection lens 37, a lens shift mechanism 35, and other components. Wireless communication 7 allows communication of a variety of data between the projector body 2 and the remote control 11.

The projection lens 37 is a lens that enlarges and projects an image on an external screen or any other object. The projection lens 37 is so disposed that it is exposed out of the projector body 2 in a direction in which image light is projected (projection direction L). In the following description, a surface where the projection lens 37 is disposed is referred to as a front surface of the projector body 2, and a surface facing away from the front surface is referred to as a rear surface. Further, when the projector body 2 is installed on a desktop or any other installation surface, a surface facing the desktop or any other installation surface is referred to as a bottom surface, and a surface facing away from the bottom surface is referred to as a top surface.

The feet 5 are formed of one front foot 5F and two rear feet 5R (one of the feet is omitted in FIG. 1), are disposed on the bottom surface of the projector body 2, and support the projector body 2 at three points (by three feet) on a desktop or any other installation surface. The front foot 5F is disposed on the bottom surface of the projector body 2 and in a position close to the front surface, and the rear feet 5R are disposed on the bottom surface of the projector body 2 and in positions close to the rear surface with the two feet separated from each other. Each of the front foot 5F and the rear feet 5R has a cylindrical screw structure and is so manually operated that the length of a protruding screw body portion changes. The inclination of the projector body 2 supported at three points is adjusted by manually operating each of the feet 5 to change the length of the screw body portion.

The lens shift mechanism 35 has a leftward/rightward shift dial 35H, an upward/downward shift dial 35V, and other rotary operation mechanisms. The leftward/rightward shift dial 35H and the upward/downward shift dial 35V are so disposed that they are exposed through the top surface of the projector body 2. The leftward/rightward shift dial 35H is a mechanism that shifts the projection lens 37 in a leftward/rightward directions. The leftward/rightward direction represents a direction perpendicular to the image projection direction L and roughly parallel to the top surface and the bottom surface of the projector body 2. The upward/downward shift dial 35V is a mechanism that shifts the projection lens 37 in an upward/downward direction. The upward/downward direction represents a direction perpendicular to the image projection direction L and oriented from the bottom surface toward the top surface of the projector body 2 (upward direction) and from the top surface toward the bottom surface (downward direction). The lens shift mechanism 35 is formed of a worm gear structure located in the projector body 2 and converts rotating power produced by the leftward/rightward shift dial 35H and the upward/downward shift dial 35V when they are manually rotated into rectilinear power that shifts the projection lens 37 in the leftward/rightward direction or the upward/downward direction.

The remote control 11 is an input device that communicates data on operation performed thereon between the remote control 11 and the projector body 2 with the aid of the wireless communication 7 and achieves a variety of settings of the projector body 2 or otherwise operates the projector body 2. The remote control 11 is part of an operation section 10, which will be described later. For example, the remote control 11 has a menu button 13, a choice switch button 15, and a finalizing button 17. When the menu button 13 is pressed, the projector body 2 projects a setting menu in the form of an image. When the choice switch button 15 is pressed in this state, a choice in the projected setting menu is switched to another, and pressing the finalizing button 17 finalizes the choice having been chosen. A variety of settings of the projector body 2 are achieved and other types of operation thereof are performed in accordance with the finalized choice. The series of actions described above are controlled and achieved by a control section 50, which will be described later.

As described above, the projector 1, in which the lens shift mechanism 35, which is manually operated, shifts the projection lens 37 in the upward/downward direction or the leftward/rightward direction, is capable of shifting the position of a projected image in the upward downward direction or the leftward/rightward direction. Further, the feet 5, which are manually operated, allow the inclination of the projector body 2 (angle of projection direction L) to be changed and hence the projection position to be shifted to a more remote position in the upward/downward direction. Since a projection surface, such as the screen on which an image is projected, is not parallel to a principal plane of the projection lens 37 in the case where the projector body 2 is inclined, a produced image having a rectangular shape is projected on the projection surface in the form of an image having a trapezoidal shape. The projector 1 has a function of adjusting projected image light projected as described above and hence having a trapezoidal shape to form projected image light having a roughly rectangular shape (projected image light is hereinafter referred to as projected image).

In the above description, the remote control 11 is used to achieve a variety of settings of the projector body 2, and a configuration in which no remote control 11 is provided may instead be employed. In this configuration, the operation buttons on the remote control 11 are disposed, for example, on the top surface of the projector body 2, and operating the thus disposed operation buttons can provide the same function as that provided by operating the remote control 11 described above.

The projector body 2 may instead be fixed to a ceiling or any other surface (hung-down posture). In this case, since the projector body 2 has an upside-down posture, the bottom surface described above is the surface facing the ceiling. The angle of the projection direction L, in which an image is projected from the projector body 2, can be changed by replacing the feet 5 on the bottom surface with a movable inclination adjustment mechanism provided on part of a fixing member that fixes the projector body 2 to the ceiling.
Schematic Block Configuration of Projector 1

Figure 2:
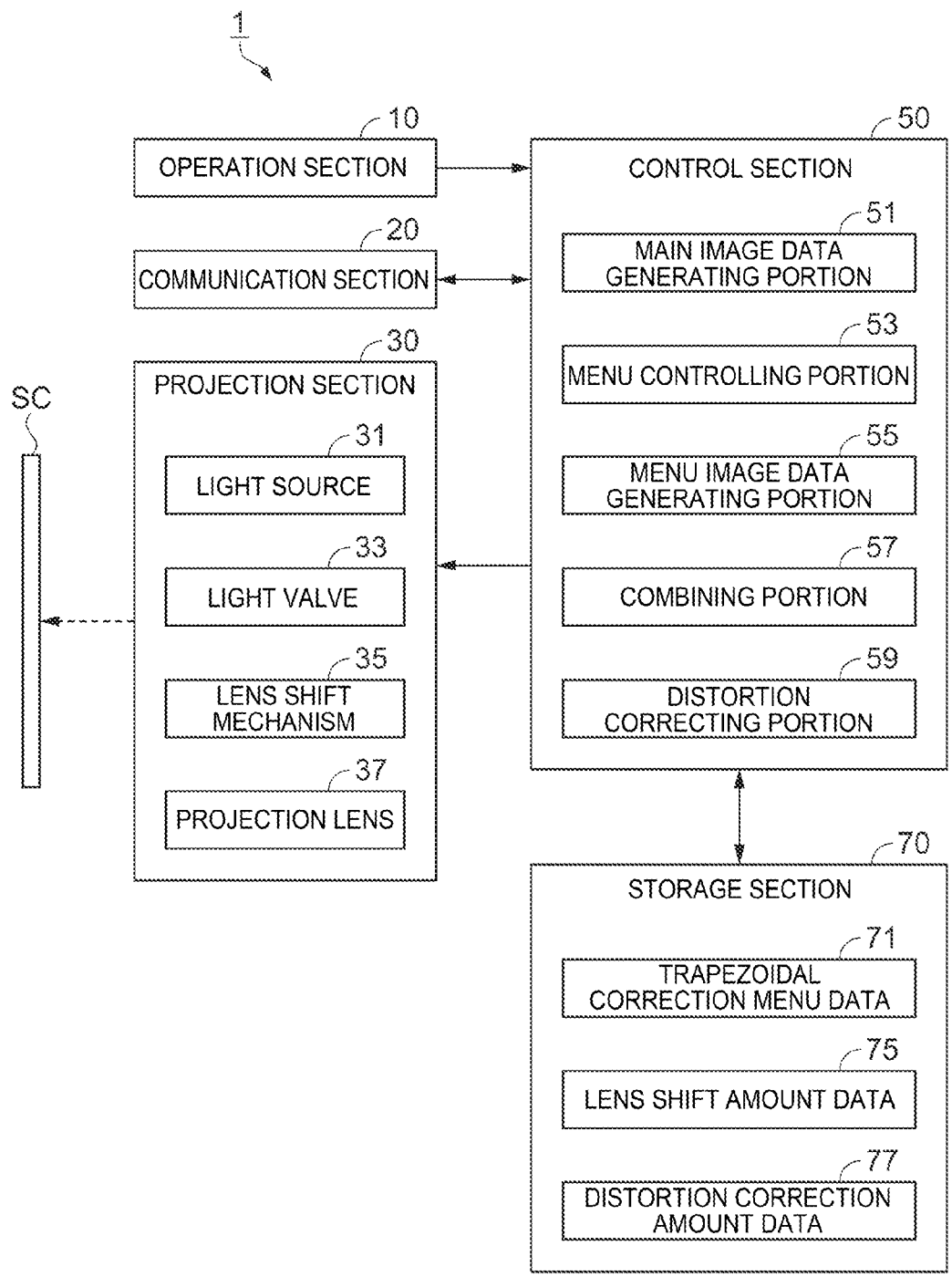
FIG. 2 is a block diagram showing a schematic configuration of the projector.

FIG. 2 is a block diagram showing a schematic configuration of the projector 1. The projector 1 is formed, for example, of an operation section 10, a communication section 20, a projection section 30, a control section 50, and a storage section 70. A screen SC is the projection surface on which a projected image is displayed.

The operation section 10 is formed, for example, of button switches provided on the projector body 2 and the remote control 11 and used to perform a variety of types of operation and button widgets (button-shaped projected images) contained in a setting menu image projected from the projector body 2.

The button switches include the menu button 13, the choice switch button 15, the finalizing button 17, and other buttons provided on the remote control 11 shown in FIG. 1 as well as the following buttons that are not shown but are provided on the projector body 2: a power button for switching the state of a power supply between ON and OFF; a trapezoidal correction button for correcting trapezoidal distortion; a focus button for performing focus adjustment; a zoom button for performing zoom adjustment; and other buttons. When a user presses any of the button switches, the operation section 10 outputs an operation signal corresponding to the pressed button switch to the control section 50.

The button widgets are button-shaped images arranged in a setting menu image produced under the control of the control section 50. Among the button widgets projected in the form of images, an image of one of the button widgets is highlighted when the choice switch button 15 on the remote control 11 is pressed. When the finalizing button 17 is pressed in this state, the choice is finalized.

When any of the button switches is pressed or any of the button widgets is chosen and finalized, the operation section 10 outputs operation command data corresponding to the chosen button to the control section 50.

The communication section 20 is formed, for example, of an infrared communication adapter, establishes the wireless communication 7 (FIG. 1), such as infrared communication, between the projector body 2 and the remote control 11, and sends and receives inputted data signals and other signals. The communication section 20 may instead be configured to have a short-distance wireless adapter or a wireless LAN adapter. In this case, the communication section 20 can communicate with an external apparatus, such as a personal computer, a smartphone, and a mobile phone, and can be connected to another projector body 2, a server, and other apparatus by using IP (Internet Protocol) over the Internet.

Further, the communication section 20 includes a physical communication terminal that is connected to an external image supply apparatus, such as a personal computer, a video reproduction apparatus, a memory card, a USB storage device, and a digital camera, (neither the communication terminal nor the external image supply apparatus is shown) via a cable, receives a variety of image signals and data signals, and outputs them to the control section 50.

The projection section 30 is formed, for example, of a light source 31, a light valve 33, the lens shift mechanism 35, and the projection lens 37 and projects image data produced by the control section 50 on the screen SC.

The light source 31 is a solid-state light source, such as an LED (Light Emitting Diode) and a laser, or a discharge-type light source, such as an ultrahigh-pressure mercury lamp and a metal halide lamp, and emits a light ray flux to the light valve 33.

The light valve 33 is formed, for example, of a transmissive liquid crystal panel and a light valve driver, adjusts light transmittance on a pixel basis in image data inputted from the control section 50, and allows the light ray flux incident from the light source 31 to pass through the liquid crystal panel. The light valve 33 thus produces image light according to the image data and outputs the image light to the projection lens 37. The light valve 33 corresponds to a light modulator.

The projection lens 37 is configured as a lens unit that is a combination of a plurality of optical lenses and causes the image light incident from the light valve 33 to exit in a direction toward the projection surface, such as the screen SC. The image light having exited out of the projection lens 37 is enlarged and projected on the projection surface, such as the screen SC.

The lens shift mechanism 35 is formed, for example, of a manual operation mechanism, such as the leftward/rightward shift dial 35H and the upward/downward shift dial 35V, and a conversion mechanism having a worm gear structure that converts the rotating power into rectilinear power. Specifically, when the user operates and rotates the leftward/rightward shift dial 35H, the lens shift mechanism 35 shifts the projection lens 37 in the leftward/rightward direction, whereas when the user operates and rotates the upward/downward shift dial 35V, the lens shift mechanism 35 shifts the projection lens 37 in the upward/downward direction.

The lens shift mechanism 35 thus uses the rotating power produced by user's manual operation to shift the projection lens 37. The thus configured lens shift mechanism allows the projector 1 to be provided at a suppressed parts cost and manufacturing cost, as compared with a configuration including an electric circuit and a motor or any other driven portion that use electric power to drive a lens shift mechanism.

The lens shift mechanism 35 corresponds to a lens shift section.

The control section 50 has a CPU (Central Processing Unit) or any other processor and oversees and controls the sections of the projector 1 in accordance with a variety of programs (not shown) stored in the storage section 70.

The control section 50 has the following functional portions: a main image data generating portion 51; a menu controlling portion 53; a menu image data generating portion 55; a combining portion 57; and a distortion correcting portion 59. It is, however, noted that the functional portions are presented only byway of example and all the functional portions are not necessarily essential configuration elements. Further, a functional portion other than those described above may be added as an essential configuration element.

The main image data generating portion 51 generates main image data. The main image data is image data that allows pixels along the entire outermost periphery of the liquid crystal panel that forms the light valve 33 to be visible in a projected image. For example, when the liquid crystal panel has WXGA (Wide extended Graphics Array) resolution, the main image data is generated in the form of image data having 1280 horizontal pixels by 800 vertical pixels. When image data is supplied from an external apparatus via the communication section 20, the main image data generating portion 51 converts the resolution of the supplied image data into the resolution of the liquid crystal panel to produce main image data. When no image data is supplied, the main image data generating portion 51 produces main image data in the form of image data in which all the pixels or at least the pixels along the outermost periphery of the liquid crystal panel are set to show an arbitrary color (blue, for example).

The liquid crystal panel corresponds to a projection panel. Further, an image generated by the liquid crystal panel corresponds to image information.

The menu controlling portion 53 generates and defines the setting menu.

To generate the setting menu, the menu image data generating portion 55 (which will be described later) is controlled to generate menu image data. The generated menu image data, after it is processed by the combining portion 57 and the distortion correcting portion 59, which will be described later, is superimposed on the main image data under the control of the control section 50, and the resultant image data is projected by the projection section 30 on the screen SC.

The definition of the setting menu includes, when one of the button widgets contained in the setting menu image is chosen, definition of a change in displayed form of the chosen button widget and a program to be executed when the chosen button widget is finalized.

After the setting menu is defined, the chosen button widget is highlighted based on an operation signal from the operation section 10, and when the chosen button widget is finalized, a defined program is executed by the control section 50. For example, the menu controlling portion 53, which has defined button widgets that forma trapezoidal correction menu 100 (which will be described later in FIG. 3) and programs to be executed, determines a change in displayed form of a button widget when the amount of lens shift, the amount of distortion correction, and other factors are chosen and a function achieved in accordance with the chosen results.

Control performed by the menu controlling portion 53 and relating to inputting the amount of lens shift in the trapezoidal correction menu 100 corresponds to a shift correction information input section.

The menu image data generating portion 55 generates the menu image data based on an instruction from the menu controlling portion 53. In detail, the menu image data generating portion 55 reads image data, character string data, arrangement information data, and other types of data (not shown) that form a menu screen and are stored in advance in the storage section 70 and puts the read data in an OSD (On Screen Display) memory (not shown) provided in the storage section 70.

The combining portion 57 generates combined image data that is a combination of the main image data and the menu image data. In detail, the menu image data generated by the menu image data generating portion 55 is superimposed on the main image data generated by the main image data generating portion 51 to generate combined image data. The combined image data is image data in which the main image data allows the outermost peripheral area of the liquid crystal panel to be visible and the menu image data allows a variety of settings to be achieved at the same time.

The distortion correcting portion 59 generates corrected image data, in which the shape of the combined image data is corrected, based on lens shift amount data 75 and distortion correction amount data 77 (both types of data will be described later) stored in the storage section 70. In detail, the combined image data in which a display color is set along the outermost periphery of the main image data has a rectangular shape on the liquid crystal panel, but when the combined image data is projected on the screen SC with the projector body 2 inclined to the screen SC, the projected image has a shape enlarged on the inclined side and trapezoidally distorted. When the trapezoidal correction menu 100 is projected in the projected image having the distorted shape and operation of modifying (correcting) the trapezoidal shape to a rectangular shape is performed through the operation section 10, a program defined by the menu controlling portion 53 is executed, and lens shift amount data 75 and distortion correction amount data 77 are stored in the storage section 70.

The distortion correcting portion 59 uses the lens shift amount data 75 and the distortion correction amount data 77 to correct the shape of the combined image data with the aid of a correction method shown in JP-A-2008-236503 and used when a lens shift occurs and a known distortion correction process of correcting distortion of an image based on the positions of the four corners of a trapezoid. The distortion correcting portion 59 thus generates corrected image data. The generated corrected image data is projected by the projection section 30, and when further correction is required, the user repeats the correction input operation.

The distortion correcting portion 59 corresponds to an image generation section.

The storage section 70 is a storage device, such as a ROM (Read Only Memory), a flash ROM, and a RAM (Random Access Memory), and stores trapezoidal correction menu data 71, the lens shift amount data 75, the distortion correction amount data 77, and other types of data. The storage section 70 further has a work area (not shown) that temporarily stores programs read and executed by the control section 50 to achieve a variety of functions, data being processed and process results of processes carried out by the control section 50, and other types of information.

Figure 3:
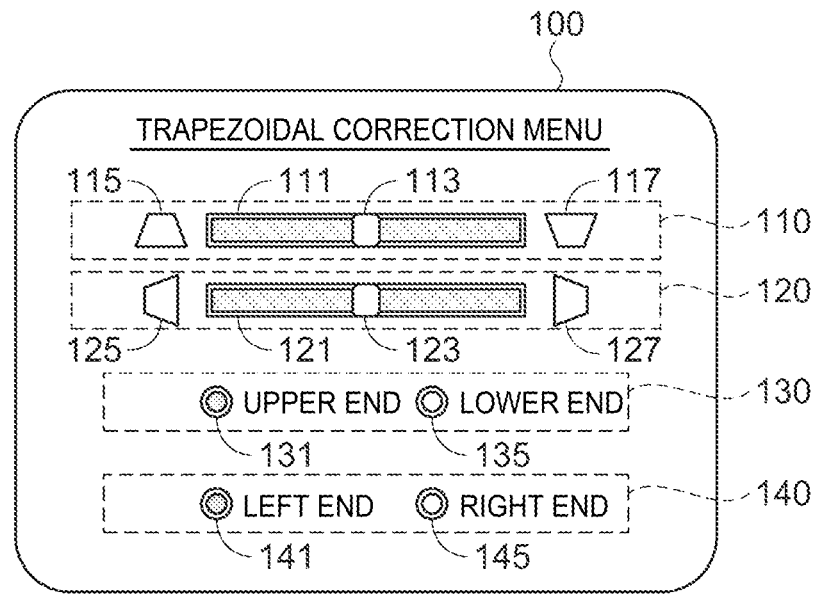
FIG. 3 is a conceptual view showing a screen of a trapezoidal correction menu.

The trapezoidal correction menu data 71 is a group of image data, such as the button widgets that form the trapezoidal correction menu 100 (FIG. 3). The trapezoidal correction menu data 71 is read by the menu image data generating portion 55 along with the lens shift amount data 75, the distortion correction amount data 77, and other types of data and put in the OSD memory. The trapezoidal correction menu data 71 is stored in the storage section 70 in advance.

The lens shift amount data 75 is data representing the amounts of lens shift in the upward/downward direction and the leftward/rightward direction. The lens shift amount data 75 is numerical data calculated based on the amount of lens shift inputted in the trapezoidal correction menu 100 and is the amount of shift of the projection lens 37 shifted from an initial position in the upward/downward direction or the leftward/rightward direction. For example, when the state of lens shift is an "upper end" or a "lower end" in the trapezoidal correction menu 100, a maximum shiftable amount by which the projection lens 37 can be shifted in the upward direction and the downward direction is calculated, and when the state of lens shift is an "right end" or a "left end" in the trapezoidal correction menu 100, a maximum shiftable amount by which the projection lens 37 can be shifted in the rightward direction and the leftward direction is calculated.

Choices of the amount of lens shift in the trapezoidal correction menu 100 and the amount of lens shift corresponding to each of the choices are stored in advance in the storage section 70 in the form of a table.

The distortion correction amount data 77 is data based on which trapezoidal distortion of a projected image is corrected. The distortion correction amount data 77 is not only numerical data calculated based on the amount of trapezoidal distortion correction inputted in the trapezoidal correction menu 100 but also data representing the amount of adjustment of the length of a side that forms the projected image and is to be corrected. The amount of adjustment is expressed in the form of proportion.

FIG. 3 is a conceptual view showing the screen of the trapezoidal correction menu 100. The trapezoidal correction menu 100 is formed of an upward/downward trapezoidal correction 110, a leftward/rightward trapezoidal correction 120, an upward/downward lens shift setting 130, and a leftward/rightward lens shift setting 140. Any of the button widgets is chosen by using the choice switch button 15 on the remote control 11, and when a choice is finalized by the finalizing button 17, a function corresponding to the chosen button widget is achieved. In the trapezoidal correction menu 100, it is assumed that a trapezoidal shape of a projected image is corrected, but a projected image does not necessarily have a trapezoidal shape having opposite sides parallel to each other. Even when a projected combined image does not have a trapezoidal shape, the trapezoidal correction menu 100 allows the length of a specified side of a distorted rectangle to be changed to convert the distorted rectangle into a roughly rectangular shape.

The upward/downward trapezoidal correction 110 and the leftward/rightward trapezoidal correction 120 correspond to a distortion correction information input section, and the upward/downward lens shift setting 130 and the leftward/rightward lens shift setting 140 correspond to an input menu image displayed by the shift correction information input section.

The upward/downward trapezoidal correction 110 is formed of an upward/downward slider 111, an upward/downward button 113, a downward trapezoid button 115, and an upward trapezoid button 117 and changes the lengths of the upper side and the lower side of a projected image to specify correction of the trapezoidal shape. When the upward/downward button 113 is caused to slide toward the downward trapezoid button 115, the upper side of the projected image is shortened. When the downward trapezoid button 115 is pressed and finalized, the upward/downward button 113 is moved toward the downward trapezoid button 115 and the upper side of the projected image is shortened. When the upward/downward button 113 is caused to slide toward the upward trapezoid button 117 or the upward trapezoid button 117 is pressed and finalized, the upper side of the projected image is lengthened.

The leftward and rightward trapezoidal correction 120 is formed of a leftward/rightward slider 121, a leftward/rightward button 123, a rightward trapezoid button 125, and a leftward trapezoid button 127 and changes the lengths of the right side and the left side of a projected image to specify correction of the trapezoidal shape. When the leftward/rightward button 123 is caused to slide toward the rightward trapezoid button 125 or the rightward trapezoid button 125 is pressed and finalized, the left side of the projected image is shortened. When the leftward/rightward button 123 is caused to slide toward the leftward trapezoid button 127 or the leftward trapezoid button 127 is pressed and finalized, the left side of the projected image is lengthened.

The upward/downward lens shift setting 130 is formed of an upper-end button 131 and a lower-end button 135 and specifies the position of the projection lens 37 to be shifted in lens shift operation. When the upper-end button 131 is pressed and finalized, the amount of shift of the projection lens 37 in lens shift operation is a maximum amount of shift in the upward direction, whereas when the lower-end button 135 is pressed and finalized, the amount of shift of the projection lens 37 in lens shift operation is a maximum amount of shift in the downward direction.

The leftward/rightward lens shift setting 140 is formed of a left-end button 141 and a right-end button 145 and specifies the position of the projection lens 37 to be shifted in lens shift operation. When the left-end button 141 is pressed and finalized, the amount of shift of the projection lens 37 in lens shift operation is a maximum amount of shift in the leftward direction, whereas when the right-end button 145 is pressed and finalized, the amount of shift of the projection lens 37 in lens shift operation is a maximum amount of shift in the rightward direction.

Procedure of Trapezoidal Correction

Figure 4:
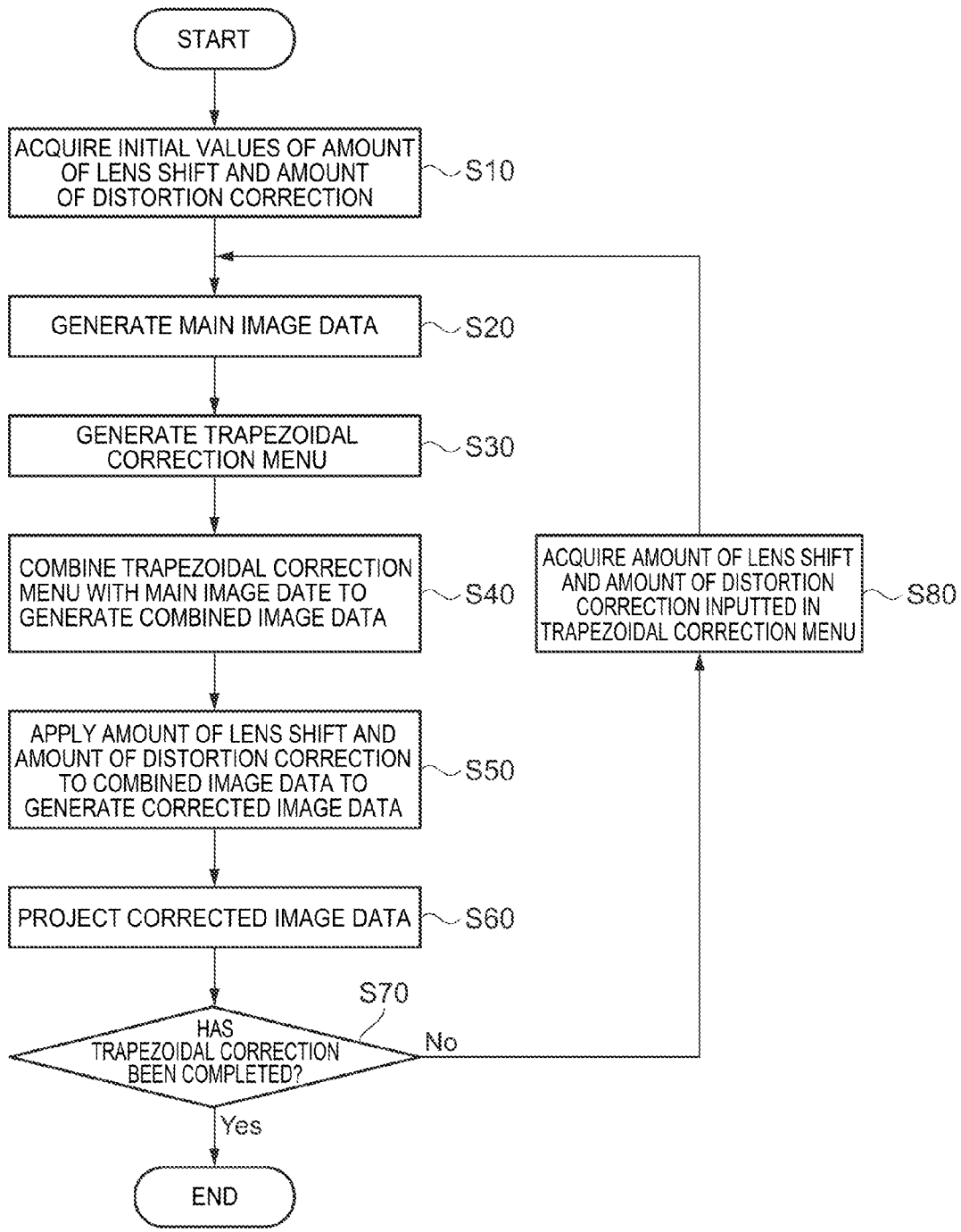
FIG. 4 is a flowchart showing trapezoidal correction menu based on the amount of lens shift amount and the amount of distortion correction.

FIG. 4 is a flowchart showing trapezoidal correction menu based on the amount of lens shift amount and the amount of distortion correction.

When the power switch on the projector body 2 is turned on, the control section 50 controls the operation section 10 to detect whether the menu button 13 on the remote control 11 has been pressed. The procedure of the distortion correction is initiated when any of the functions in the trapezoidal correction menu 100 is chosen, for example, through the menu button 13 and the choice switch button 15.

First, initial values of the amount of lens shift and the amount of distortion correction are acquired (step S10). The initial values are stored in the storage section 70 in advance. The main image data is then generated (step S20). The main image data is data that allows arbitrary color data to be set at all pixels (at least pixels along outermost periphery) of the liquid crystal panel. The trapezoidal correction menu 100 is then generated (step S30). To generate the trapezoidal correction menu 100, the amount of lens shift and the amount of distortion correction acquired in step S10 or step S80 (which will be described later) are reflected in the displayed trapezoidal correction menu 100. Specifically, the positions where the upward/downward button 113 and the leftward/rightward button 123 are displayed and a chosen button widget in each of the upward/downward lens shift setting 130 and the leftward/rightward lens shift setting 140 are determined.

The trapezoidal correction menu is then combined with the main image data to generate combined image data (step S40). The amount of lens shift and the amount of distortion correction are applied to the combined image data to generate corrected image data (step S50). The data acquired in step S10 or step S80 are used as the amount of lens shift and the amount of distortion correction. The corrected image data is then projected (step S60). The projection is performed based on the corrected image data outputted to the projection section 30.

Whether or not the trapezoidal correction has been completed is then evaluated (step S70). When a completion button on the operation section 10 is pressed, the control section 50 determines that the trapezoidal correction has been completed (step S70; Yes), and the procedure of the trapezoidal correction is terminated. When it is detected that any of the buttons in the trapezoidal correction menu 100 has been pressed by using the operation section 10, the control section 50 determines that the trapezoidal correction has not been completed but is being performed (step S70; No) and proceeds to step S80. In step S80, the amount of lens shift and the amount of distortion correction inputted in the trapezoidal correction menu are acquired. The control then proceeds to step S20 and the process in step S20 and the following processes are repeated.

As described above, the projector 1 according to the present embodiment can provide the following advantageous effects.

The projector 1 acquires the position of the projection lens 37 shifted by the lens shift mechanism 35, which is manually operated, via the menu controlling portion 53 and the operation section 10. The position of the projection lens 37 to be acquired can be chosen from the choices of the maximum amounts of shift corresponding to the upper end, the lower end, the right end, and the left end in the trapezoidal correction menu 100 projected by the menu controlling portion 53. Since a user who requires trapezoidal correction uses the lens shift mechanism 35 to a maximal degree and further inclines the projector body 2 for projection, providing the choices of the maximum amounts of shift allows the user to readily choose a lens shift position.

Further, the distortion correcting portion 59 generates corrected image data having a shape calculated based on the amount of distortion correction set in the trapezoidal correction menu 100 and in consideration of an acquired amount of lens shift. As described above, the position of the lens shifted by the manual lens shift mechanism is acquired, and appropriate distortion correction is achieved on a lens position basis.

The invention is not limited to the embodiment described above, and a variety of changes and improvements can be made to the embodiment described above. Variations will be described below.

Variation 1

Variation 1 will be described with reference to FIGS. 5A to 5C.

Figure 5A:
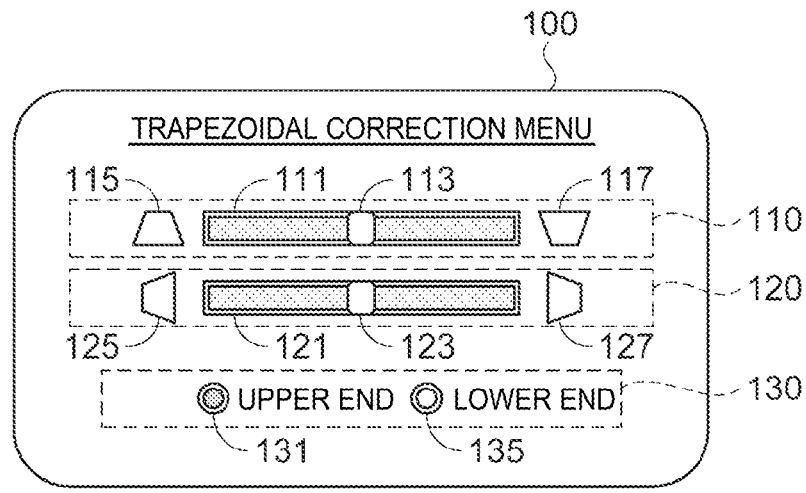
FIGS. 5A to 5C are conceptual views showing screens of trapezoidal correction menus according to Variation 1.
Figure 5B:
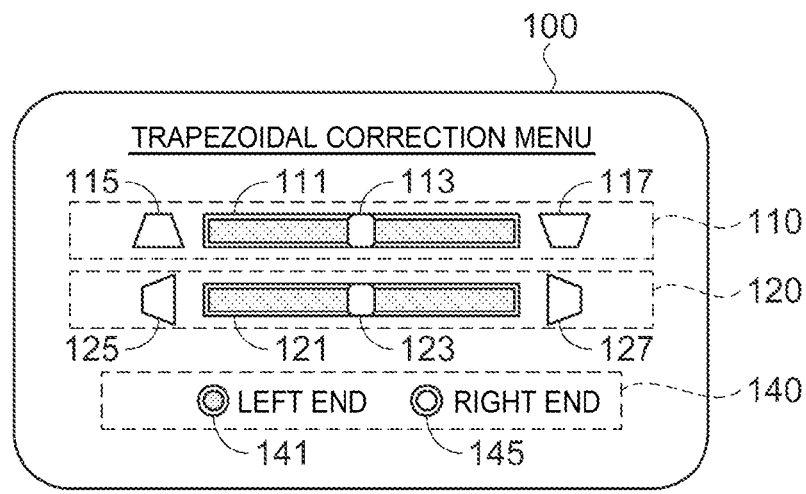
Figure 5C:
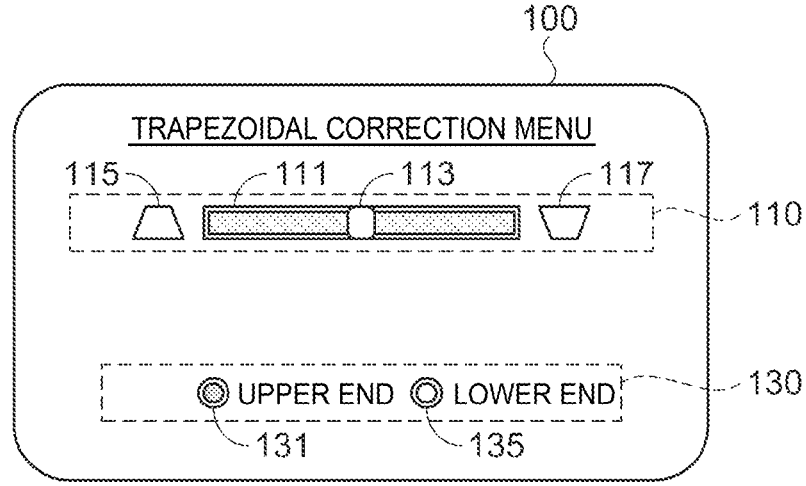

FIGS. 5A, 5B, and 5C are conceptual views showing the screens of trapezoidal correction menus according to Variation 1. The above embodiment has been described with reference to the conceptual screen of the trapezoidal correction menu 100 formed of the upward/downward trapezoidal correction 110, the leftward/rightward trapezoidal correction 120, the upward/downward lens shift setting 130, and the leftward/rightward lens shift setting 140 shown in FIG. 3, but this configuration is not necessarily used.

For example, the leftward/rightward lens shift setting 140 (FIG. 3) may be omitted, as shown in FIG. 5A. This configuration is suitable, for example, for a case where the projection surface is narrow in the leftward/rightward direction but long in the upward/downward direction in the environment where the projector 1 is installed or a configuration in which the lens shift mechanism 35 includes no leftward/rightward shift dial 35H.

Instead, the upward/downward lens shift setting 130 (FIG. 3) may be omitted, as shown in FIG. 5B. This configuration is suitable, for example, for a case where the projection surface is short in the upward/downward direction but wide in the leftward/rightward direction in the environment where the projector 1 is installed or a configuration in which the lens shift mechanism 35 includes no upward/downward shift dial 35V.

Still instead, the leftward/rightward trapezoidal correction 120 (FIG. 3) and the leftward/rightward lens shift setting 140 (FIG. 3) may be omitted, as shown in FIG. 5C. This configuration is suitable, for example, for a case where the projection surface is narrow in the leftward/rightward direction but long in the upward/downward direction in the environment where the projector 1 is installed or a configuration in which the lens shift mechanism 35 includes no leftward/rightward shift dial 35H, as in the example shown in FIG. 5A. As described above, the number of parts of the lens shift mechanism 35 can be reduced, whereby the projector 1 can be provided at a further reduced cost.

Variation 2

Variation 2 will be described with reference to FIG. 6.

Figure 6:
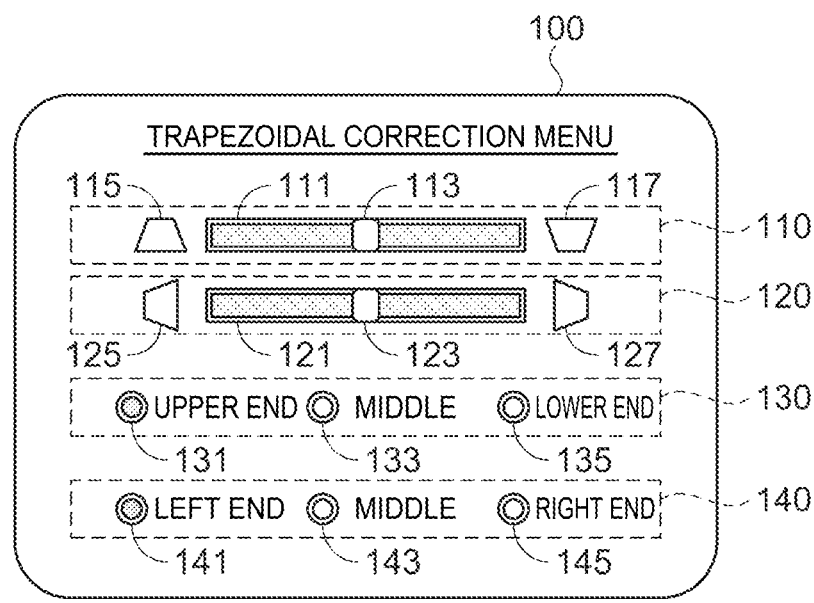
FIG. 6 is a conceptual view showing a screen of a trapezoidal correction menu according to Variation 2.

FIG. 6 is a conceptual view showing the screen of a trapezoidal correction menu according to Variation 2. In the embodiment and the variation described above, the upward/downward lens shift setting 130 and the leftward/rightward lens shift setting 140 in the conceptual screen of the trapezoidal correction menu 100 have choices of the maximum amounts of lens shift, but this configuration is not necessarily used.

For example, an upward/downward middle button 133, which corresponds to the middle amount between the maximum amount of upward lens shift and the maximum amount of downward lens shift, may be provided, as shown in FIG. 6. Similarly, a leftward/rightward middle button 143, which corresponds to the middle amount between the maximum amount of leftward lens shift and the maximum amount of rightward lens shift, may be provided.

Since the middle positions in the upward/downward direction and the leftward/rightward direction are positions where the projection lens 37 is not shifted, this setting is optimum for a case where the user has not operated the upward/downward shift dial 35V or the leftward/rightward shift dial 35H to shift the position of the projection lens 37. This setting is therefore suitable for a case where the user does not use the lens shift mechanism 35 but uses the trapezoidal correction menu 100 for trapezoidal distortion correction.

Variation 3

Variation 3 will be described with reference to FIG. 7.

Figure 7:
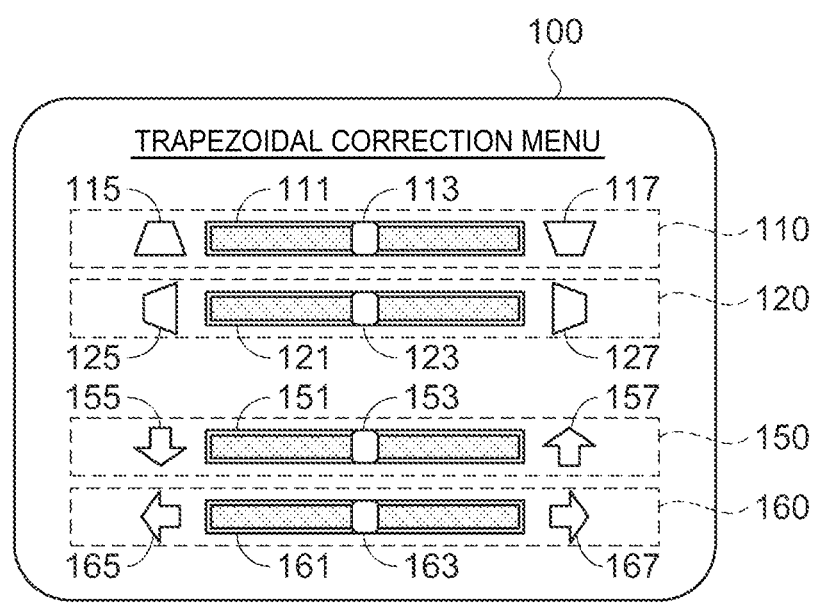
FIG. 7 is a conceptual view showing a screen of a trapezoidal correction menu according to Variation 3.

FIG. 7 is a conceptual view showing the screen of a trapezoidal correction menu according to Variation 3. In the embodiment and the variations described above, the upward/downward lens shift setting 130 and the leftward/rightward lens shift setting 140 in the conceptual screens of the trapezoidal correction menu 100 have choices of the two-step or three-step amounts of lens shift including the upper end and the lower end or the upper end, the lower end, and the middle, but this configuration is not necessarily used.

For example, an upward/downward lens shift setting 150 and a leftward/rightward lens shift setting 160 are provided, as shown in FIG. 7. The upward/downward lens shift setting 150 includes an upward/downward lens shift slider 151, an upward/downward lens shift button 153, a downward lens shift button 155, and an upward lens shift button 157. Similarly, the leftward/rightward lens shift setting 160 includes a leftward/rightward lens shift slider 161, a leftward/rightward lens shift button 163, a leftward lens shift button 165, and a rightward lens shift button 167.

According to the configuration, the upward/downward lens shift button 153 and the leftward/rightward lens shift button 163 can be caused to slide within the ranges of the upward/downward lens shift slider 151 and the leftward/rightward lens shift slider 161 to set the amount of lens shift in multiple steps greater than the three steps (five steps, for example). When the user uses the lens shift mechanism 35 to set the position of the projection lens 37 in an arbitrary position between the position corresponding to one of the maximum amounts of shift and the position corresponding to the middle amount of shift, the user can choose the arbitrary position by using the slider bars, whereby trapezoidal correction based on an appropriate amount of lens shift can be performed.

Variation 4

Variation 4 will be described with reference to FIG. 3.

In the embodiment and the variations described above, the trapezoidal correction menu 100 includes the upward/downward lens shift setting 130 and the leftward/rightward lens shift setting 140, but this configuration is not necessarily used. For example, the trapezoidal correction menu 100 may not include the upward/downward lens shift setting 130 or the leftward/rightward lens shift setting 140. In this case, when the upward/downward trapezoid button 113 of the upward/downward distortion correction 110 is located in a position shifted from the middle of the upward/downward slider 111 toward the downward trapezoid button 115, the distortion correction is performed assuming that the projection lens 37 is located at the upper end. Similarly, when the upward/downward button 113 is located in a position shifted from the middle of the upward/downward slider 111 toward the upward trapezoid button 117, the distortion correction is performed assuming that the projection lens 37 is located at the lower end.

Further, in the leftward/rightward trapezoidal correction 120, when the leftward/rightward button 123 is located in a position shifted from the middle of the leftward/rightward slider 121 toward the rightward trapezoid button 125, the distortion correction is performed assuming that the projection lens 37 is located at the left end. Similarly, when the leftward/rightward button 123 is located in a position shifted from the middle of the leftward/rightward slider 121 toward the leftward trapezoid button 127, the distortion correction is performed assuming that the projection lens 37 is located at the right end.

According to the configuration described above, when the projection position is adjusted by using the lens shift mechanism 35 to shift the projection lens 37 to extreme positions and further inclining the projector body 2, the user does not need to be aware of the setting of the lens shift mechanism 35 but can achieve distortion correction with simple operation.

Variation 5

Variations will be described with reference to FIGS. 8A to 8C.

Figure 8A:
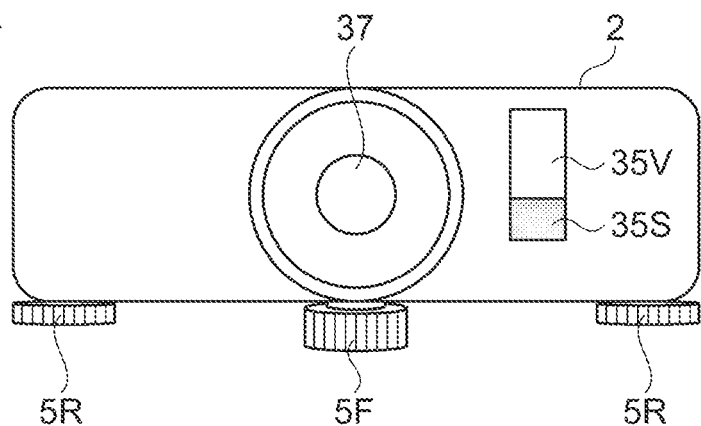
FIGS. 8A to 8C are exterior appearance front views for describing the lens shift and inclination of a projector according to Variation 5.
Figure 8B:
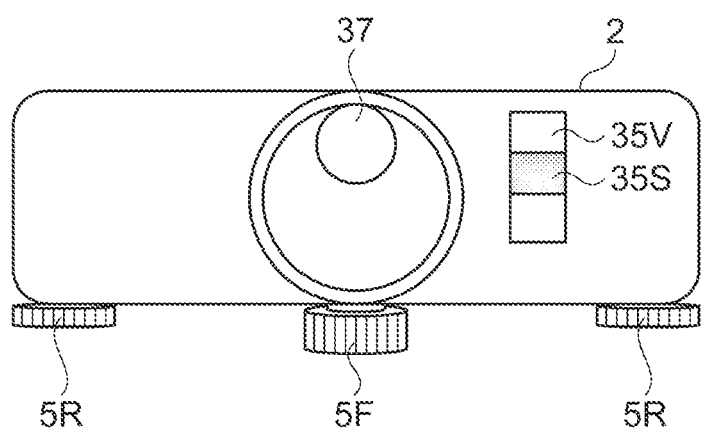
Figure 8C:
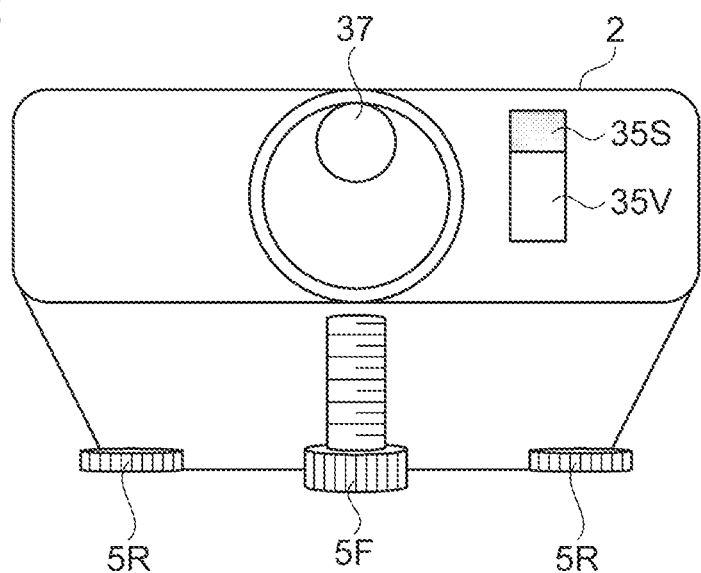

FIGS. 8A to 8C are exterior appearance front views for describing the lens shift and the inclination of a projector according to Variation 5. FIG. 8A is a front view in a case where no lens shift is made or the lens is located at the middle and the projector is not inclined. FIG. 8B is a front view in a case where the lens shift is so made that the lens is located at the upper end and the projector is not inclined. FIG. 8C is a front view in a case where the lens shift is so made that the lens is located at the upper end and the projector is inclined upward by a maximum amount.

The projector body 2 includes the projection lens 37, the feet 5 (front foot 5F, rear feet 5R), and the upward/downward shift dial 35V and a knob 35S provided in the lens shift mechanism 35. The projection lens 37 and the feet 5 have the same mechanisms as those in the first embodiment. The lens shift mechanism 35 differs from the lens shift mechanism in the first embodiment. In the first embodiment, the lens shift mechanism has a structure in which the projection lens 37 is shift in the upward/downward direction when a dial portion of the upward/downward shift dial 35V is rotated, whereas in the present variation, the lens shift mechanism has a structure in which the upward/downward shift dial 35V is operated in the upward/downward direction to shift the projection lens 37. The upward/downward shift dial 35V according to the present variation is integrated with the knob 35S, which is a "lever" portion, and the knob 35S is movable in the upward/downward direction.

In FIG. 8A, the knob 35S is located at the lower end in the upward/downward shift dial 35V, and the projection lens 37 is located at the middle of the projector body 2. In FIG. 8B, the knob 35S is shifted upward. In this state, the projection lens 37 has been shifted to the upper end. In FIG. 8C, the knob 35S reaches the upper end with the projection lens 37 shifted to the upper end, and the front foot 5F is lengthened.

During the shift of the projection lens 37 from the middle to the upper end (from FIG. 8A to FIG. 8B), the projection position is shifted upward with a projected image projected on the screen SC maintaining a substantially rectangular shape without any distortion correction. During lengthening of the front foot 5F (from FIG. 8B to FIG. 8C), distortion correction is required because the inclination of the projector body 2 changes. During the lengthening operation, in which the projection lens 37 is located at the upper end, the trapezoidal correction menu 100 in Variation 4 is used to display the upward/downward trapezoidal correction 110 for distortion correction. As described above, according to the present variation, accurate distortion correction can be achieved without causing the user to input a lens shift position.

In the present variation, the upward/downward shift dial 35V shifts the projection position upward from an initial position, and the projection position may instead be shifted downward. In this case, after the projection lens 37 is shifted downward and reaches the lower end, the rear feet 5R are lengthened. The mechanism described above allows distortion correction to be performed with the projection surface shifted downward and the position of the projection lens 37 fixed at the lower end.

Variation 6

In addition to the configurations of the embodiment and the variations described above, an acceleration sensor, an angular velocity sensor, or any other sensor that detects the inclination of the projector body 2 may be provided. These sensors detect the inclination of the projector body 2 under the control of the control section 50 after any of the feet is lengthened. The control section 50 is capable of automatically correcting distortion of a projected image based on the detected inclination and the amount of lens shift.

Variation 7

In the embodiment and the variations described above, the light valve 33 is a liquid crystal light valve including a liquid crystal panel, but this configuration is not necessarily employed. The light valve 33 may instead be a light valve based on DLP (Digital Light Processing) (registered trademark).

Variation 8

In the embodiment and the variations described above, the trapezoidal correction menu 100 is put in the OSD memory and projected as a projected image, but this configuration is not necessarily employed. A display section having a display surface exposed out of a case surface of the projector body 2 may be further provided, and part or entirety of the information displayed in the trapezoidal correction menu 100 may be displayed on the display section. According to this configuration, in a case where the projector body 2 is installed in a position near a user who operates the projector, the user can operate distortion correction at hand. The display section may instead be provided on the remote control 11.

Variation 9

Variation 9 will be described with reference to FIG. 5C.

In the embodiment and the variations described above, the upward/downward lens shift setting 130 has choices of the upper end 131 and the lower end 135, as shown in the conceptual view of the screen of the trapezoidal correction menu in FIG. 5C, and the choice of the lower end 135 may be replaced with a choice of "no shift." According to this configuration, in the mechanism including the lens shift mechanism 35 and the feet 5 that cooperatively perform the lens shift as in Variation described above, choosing the upper end 131 allows appropriate trapezoidal correction to be performed. On the other hand, when the lens shift mechanism 35 is not used, choosing "no shift" allows appropriate trapezoidal correction to be performed with no lens shift made.

In the prevent variation, the choices of the upper end 131 and "no shift" correspond to a distortion correction mode choosing section, the choice of the upper end 131 corresponds to a first mode in which a maximum amount of upward shift is considered, and the choice of "no shift" corresponds to a second mode in which no amount of shift is considered.

What is claimed is:

1. A projector comprising:
   a light source;
   a light modulator that modulates light emitted from the light source in accordance with image information to form image light;
   a projection section that projects the image light modulated in the light modulator through a lens;
   a lens shift section that is capable of lens shift of shifting the lens in at least one of an upward/downward direction and a leftward/rightward direction;
   a distortion correction information input section that allows input of distortion correction information used to correct distortion of a projected image light projected by the projection section on a projection surface;
   a shift correction information input section that allows input of shift correction information relating to the lens shift; and
   an image generation section that generates the image information based on the distortion correction information and the shift correction information,
   wherein
     the shift correction information input section has an input menu image to be projected by the projection section, and
     the input menu image contains a plurality of choices to choose from to input the shift correction information, and the plurality of choices include a choice representing a maximum amount of lens shift of the lens in at least one of the upward/downward direction and the leftward/rightward direction and a choice representing a middle amount of lens shift of the lens in at least one of the upward/downward direction and the leftward/rightward direction.

2. A projector comprising:

a light source;

a light modulator that modulates light emitted from the light source in accordance with image information to form image light;

a projection section that projects the image light modulated in the light modulator through a lens;

a lens shift section that is capable of lens shift of shifting the lens in at least one of an upward/downward direction and a leftward/rightward direction;

a distortion correction information input section that allows input of distortion correction information used to correct distortion of a projected image light projected by the projection section on a projection surface;

an image generation section that generates the image information based on the distortion correction information; and a distortion correction mode choosing section that allows a mode of the distortion correction information to be chosen, wherein the distortion correction information is set in consideration of a maximum amount of shift of the lens in the upward direction, and the mode of the distortion correction information includes a first mode in which the maximum amount of shift of the lens in the upward direction is considered and a second mode in which the amount of lens shift is not considered.

3. A projector comprising:

a light source;

a light modulator that modulates light emitted from the light source in accordance with image information to form image light;

a projection section that projects the image light modulated in the light modulator through a lens;

a lens shift section that is capable of lens shift of shifting the lens in at least one of an upward/downward direction and a leftward/rightward direction;

a distortion correction information input section that allows input of distortion correction information used to correct distortion of a projected image light projected by the projection section on a projection surface;

a shift correction information input section that allows input of shift correction information relating to the lens shift; and an image generation section that generates the image information based on the distortion correction information and the shift correction information, wherein the shift correction information input section has an input menu image to be projected by the projection section, and the input menu image contains a plurality of choices to choose from to input the shift correction information, and the plurality of choices include a choice representing a maximum amount of lens shift of the lens in the upward/downward direction.

4. A projector comprising:

a light source;

a light modulator that modulates light emitted from the light source in accordance with image information to form image light;

a projection section that projects the image light modulated in the light modulator through a lens;

a lens shift section that is capable of lens shift of shifting the lens in at least one of an upward/downward direction and a leftward/rightward direction;

a distortion correction information input section that allows input of distortion correction information used to correct distortion of a projected image light projected by the projection section on a projection surface;

a shift correction information input section that allows input of shift correction information relating to the lens shift; and an image generation section that generates the image information based on the distortion correction information and the shift correction information, wherein the shift correction information input section has an input menu image to be projected by the projection section, and the input menu image contains a plurality of choices to choose from to input the shift correction information, and the plurality of choices include a choice representing a maximum amount of lens shift of the lens in the leftward/rightward direction.

* * * * *